E. S. JONES.
VEHICLE FENDER.
APPLICATION FILED DEC. 31, 1914.
1,152,320. Patented Aug. 31, 1915.
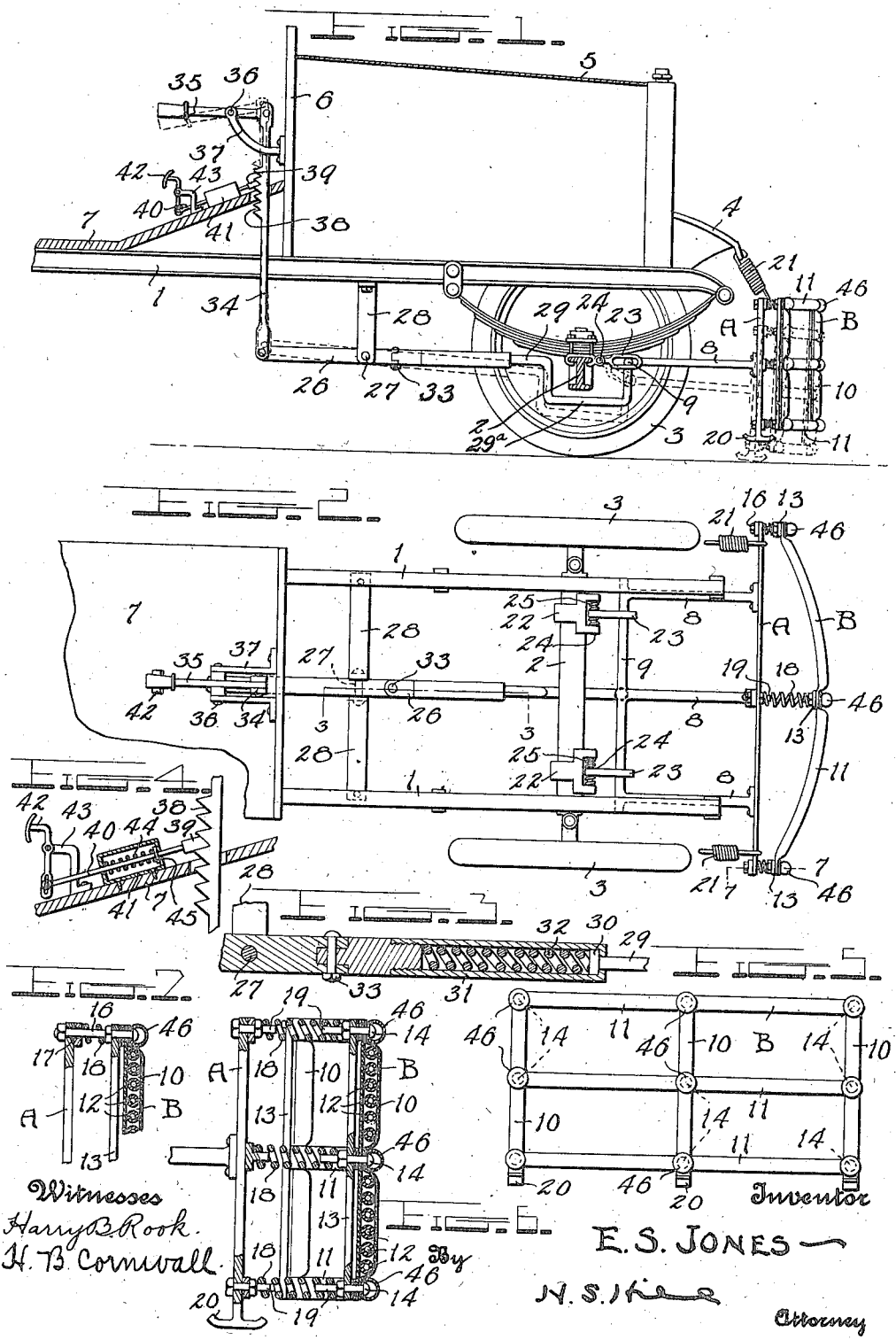

UNITED STATES PATENT OFFICE.

EDWARD S. JONES, OF MOBILE, ALABAMA, ASSIGNOR OF ONE-HALF TO J. LESLIE TAYLOR, OF MOBILE, ALABAMA.

VEHICLE-FENDER.

1,152,320.   Specification of Letters Patent.   Patented Aug. 31, 1915.

Application filed December 31, 1914.   Serial No. 879,934.

*To all whom it may concern:*

Be it known that I, EDWARD S. JONES, a citizen of the United States, residing at Mobile, in the county of Mobile and State of Alabama, have invented certain new and useful Improvements in Vehicle-Fenders, of which the following is a specification.

The present invention relates to an improved fender for vehicles, and has for its object to provide a device of this character which embodies novel features of construction whereby there will be no possibility of the victim of an accident being run over by the wheels of the vehicle, and the injury to the person will be minimized.

Further objects of the invention are to provide a fender which is so constructed as to absorb the initial shock to the fullest possible extent, which can be easily mounted upon any conventional construction of vehicle and is at all times under the complete control of the operator, and which can be adjusted to normally stand at any desired height above the surface of the road, depending upon the character of the road over which the vehicle is traveling.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a fragmentary elevation of the front end of an automobile of the conventional construction showing the fender mounted in position thereon, portions being broken away and shown in section and the fender being shown by full lines in a raised position and by dotted lines in a lowered position. Fig. 2 is a top plan view of the fender and front end of the automobile with portions of the automobile removed to bring out more clearly the construction of the fender and the manner of mounting the same. Fig. 3 is a sectional view showing the spring plunger construction at the forward end of the supporting beam. Fig. 4 is a detail perspective view of the latch member which normally holds the fender in a slightly raised position. Fig. 5 is a front elevation of the fender. Fig. 6 is a vertical sectional view taken through the center of the fender. Fig. 7 is a fragmentary horizontal sectional view through one side of the fender on the line 7—7 of Fig. 2.

Corresponding and like parts are referred to in the following description and indicated in all the views of the drawing by the same reference characters.

For the purpose of illustration the invention is shown as applied to the forward end of an automobile which may be of the conventional construction and is only illustrated in a fragmentary manner, although it will be understood that the fender is equally well adapted for use in connection with other vehicles of a like character.

Describing the automoblie as shown in a general manner, the numeral 1 designates the main frame, 2 the front axle, 3 the front wheels, 4 the mud guards, 5 the hood, 6 the dash, and 7 the floor.

The fender includes a main frame A and a buffer frame B which is yieldably mounted upon the front thereof, the said fender being vertically disposed and extending transversely across the front of the vehicle so that when it is in operative position it will be impossible for the wheels of the vehicle to run over any unfortunate person who may be struck, and the injury to the said person will be minimized to the fullest possible extent.

The main fender frame A may be of any suitable construction and is supported by means of a series of arms 8 which project rearwardly therefrom and have their extremities connected by a transverse supporting bar 9. The arms 8 and transverse bar 9 provide a supporting bracket which is rigidly connected to the fender frame A.

The buffer frame B of the fender has the face thereof composed entirely of rubber tubes which may either be filled with inner air tubes or with soft rubber balls so as to provide a construction which will absorb the shock without any unnecessary rebound. As illustrated, there are three upright rubber tubes 10 connected at suitable intervals by the horizontally disposed rubber tubes 11, said rubber tubes being filled with the firm soft rubber balls 12. The vertical rubber tube 10 at the middle of the fender is normally disposed in advance of the two side rubber tubes 10, and a vertical bar 13 is shown as arranged back of each of the said vertical tubes 10. Suitable fastening members, as indicated at 14, may be employed for connecting the horizontal rubber tubes 11 and the vertical rubber tubes 10, as well as for securing the latter to the vertical bars 13.

A yielding connection is preferably provided between the cushioning frame B of the fender and the main frame A. This may be accomplished in any desired manner, although in the present instance the corners of the buffer frame B are shown as provided with the rearwardly extending bolts 16 which slide freely through guide openings 17 in the main frame A, coil springs 18 which surround the bolts 16 being interposed between the two frames so as to provide a cushioning means to aid in absorbing shocks and jars. In an analogous manner coil springs 18 are interposed between the main frame A and the central vertical bar 13 of the buffer frame B, the ends of the said coil springs being engaged by suitable positioning pins 19. The lower edge of the main frame A is provided with suitable shoes 20 adapted to engage the road or track to prevent the lower rubber tubes of the buffer frame B from coming into contact therewith when the fender is dropped to the lowest limit of its movement. It will also be observed that the upper edge of the main frame A of the fender is connected by means of tension springs 21 to suitable portions of the vehicle such as the mud guards 4. These springs 21 are not of sufficient strength to counteract the weight of the fender and lift the same, but merely serve to partially counteract the said weight so that the fender can be readily lifted by the operator.

The transverse bar 9 of the fender supporting bracket is mounted upon the vehicle axle 2 in such a manner that it can move bodily back and forth and can at the same time swing bodily downwardly and rearwardly. Clips 22 may be applied to the front axle 2, and slotted hangers 23 are pivotally connected to these clips at 24, the transverse bar 9 being loosely received within the slotted portions of the hangers. Springs 25 may be applied to the hinged connections 24 and these springs normally tend to swing the slotted hangers 23 upwardly into the position indicated by full lines on Fig. 1.

Extending longitudinally under the frame of the vehicle immediately to the rear of the front axle 2 is a beam 26 which is pivotally mounted at an intermediate point in its length, as indicated at 27, on the lower end of a bracket 28 which projects downwardly from the frame 1 of the vehicle. A plunger 29 is slidably mounted upon the forward end of the beam 26, the end of the plunger having a U shaped or crimped formation, as indicated at 29$^a$, so as to clear the axle 2, the extremity of the plunger being rigidly connected to the supporting bracket of the fender. The rear end of the plunger 29 is shown as terminating in a piston 30 which slides within a tubular guide 31 removably applied to the end of the beam 26, a cushioning spring 32 being interposed between the end of the beam and the piston 30. It may also be noted at this point that the longitudinal beam 26 is provided at a suitable point in its length with a hinge joint 33 so that the forward end thereof can swing laterally in either direction as may be required to accommodate the fender construction and mountings to the relative movements of the different parts of the vehicle when in use.

The rear end of the operating beam 26 is connected by an upright link 34, which extends through the floor of the vehicle to one end of a controlling lever 35, said lever being pivotally mounted at an intermediate point in its length, as indicated at 36, upon a bracket 37 which projects rearwardly from the dash 6. At this point where the link 34 passes through the floor 7 of the vehicle it is shown as provided with a rack 38 adapted to be engaged by the nose 39 of a foot controlled detent 40. The detent 40 is slidably mounted within a suitable guide 41 and has the rear end thereof pivotally connected to an upright foot lever 42 which is mounted upon a bracket 43 projecting upwardly from the floor 7. A coil spring 44 surrounds the sliding detent 40 and the forward end of the said spring abuts against a collar 45 upon the detent 40 while the rear end thereof engages one end of the guide casing 41. The spring normally holds the nose 39 of the sliding detent 40 in engagement with the rack 38 of the upright link member 34, although as soon as the upper end of the foot lever 42 is pushed forward the sliding detent will be withdrawn and the nose thereof disengaged from the rack so that the fender can drop by its own weight into operative position. If desired, an operative connection may be provided between the emergency brake lever of the automobile and the upright foot lever 42 of the fender mechanism so that the said upright foot lever will be automatically removed to release the fender at the same time the emergency brake lever is manipulated to apply the brake.

With the foregoing construction it will be obvious that the fender is mounted upon the forward end of the operating beam 26 so that it may swing up and down about the pivot point 27 as a center. The springs 21 are not sufficiently strong to overcome the weight of the fender and lift the same, but the fender is normally held in a slightly elevated position above the surface of the road by means of the engagement of the detent 40 with the teeth of the rack 38 on the upright link member 34. In order to initially lift the fender into this elevated position, the latch member 40 is temporarily moved into an inoperative position and the controlling lever 35 swung upwardly. When the fender has thus been properly adjusted and positioned at the correct elevation the latch member 40 is permitted to swing back into operative position. The fender will thus be normally held at a slight elevation above the surface of the road so as not to interfere with the movements of the vehicle, the exact elevation of the fender depending upon the character of the road, a greater elevation being necessary for rough roads than for smooth roads. In case of emergency the operator would either release the detent 40 with his foot or have the said detent arranged so as to be automatically released when the emergency brake is applied, thereby permitting the fender to drop until the shoes 20 at the bottom thereof rest upon the road. The use of this fender would render it impossible for the wheels of the vehicle to run over any person struck thereby, and the various cushioning springs, as well as the use of soft rubber hose on the front of the buffer frame would minimize the effect of the impact so that but slight injury would be caused to the victim.

In constructing the buffer frame B the heads of the securing bolts 14 are provided with rubber washers or caps 46 so that all of the connections and metal portions of the buffer frame are protected by rubber, and it will be impossible for any metal to come into contact with a person struck by the fender.
It will also be understood that the transversely disposed rubber tubes 11 of the buffer frame B may be placed as close together as may be desired or found necessary, the number of these tubes which are used depending upon the size of the fender and the purpose for which it is to be used. Ordinarily the cross tubes 11 of the fender would be placed sufficiently close together so that it is impossible for even a child to be caught between the tubes and brought into contact with any metal parts to the rear thereof.

Having thus described the invention, what I claim as new and desire to secure by Letters Patent, is:—

1. A fender including a main fender frame, a buffer frame yieldably mounted thereon, a swinging beam extending under the vehicle and having one end thereof connected to the main fender frame, counterbalancing springs connected to the main fender frame and partially overcoming the weight thereof, and latch means coöperating with the beam to normally hold the main fender frame in a raised position, the said fender frame dropping by gravity into a lowered position as soon as the latch means is released.

2. A fender including a fender member, a beam pivotally mounted between its ends, a plunger yieldably mounted upon one end of the beam and having an operative connection with the fender member, means for swinging the beam to lift the fender member into an elevated position, and detent means for releasing the beam to permit of the fender member dropping into a lowered position.

3. A fender including a fender member, a bracket projecting rearwardly therefrom, swinging hangers mounted upon the axle and loosely engaging the bracket, a longitudinally disposed beam pivotally mounted at an intermediate point in its length, a plunger mounted upon one end of the longitudinal beam and rigidly connected to the bracket, means for swinging the beam to elevate the fender member, and a detent for holding the beam in an adjusted position, the fender member dropping into a lowered position as soon as the detent is released.

4. A fender including a fender member, a bracket projecting rearwardly therefrom and including a transverse bar, swinging hangers pivotally mounted upon the axle and loosely engaging the transverse bar, a longitudinally disposed beam pivotally mounted at an intermediate point in its length, a plunger yieldably mounted upon one end of the beam and connected to the bracket, a controlling lever, a link connecting the controlling lever to the opposite end of the beam for swinging the beam to elevate the fender member, and a detent engaging the link to hold the beam in an adjusted position, the fender member dropping into a lowered position when the detent is released.

5. A fender including a main fender frame, a buffer frame extending across the front thereof and yieldably mounted thereon, a bracket projecting rearwardly from the main fender frame and formed with a transverse bar, hangers hinged to the front axle and loosely engaging the said transverse bar, a longitudinally disposed beam arranged under the vehicle at the rear of the front axle and pivotally mounted at an intermediate point in its length, a plunger yieldably mounted upon the forward end of the longitudinal beam and rigidly connected to the bracket, said plunger having an offset portion to provide a clearance for the axle, an operating lever, a link connecting the operating lever to the rear end of the longitudinal beam so that by moving the operating lever the beam can be tilted to elevate the fender frame, and a detent engaging the link to hold the beam in an adjusted position, the fender frame dropping into a lowered position when the detent is released.

In testimony whereof I affix my signature in presence of two witnesses.

EDWARD S. JONES.

Witnesses:
 J. A. JOULLION,
 WM. BAXTER.